US012437908B2

(12) United States Patent
Daniel et al.

(10) Patent No.: US 12,437,908 B2
(45) Date of Patent: *Oct. 7, 2025

(54) METHODS AND APPARATUS FOR GENERATING MAGNETIC FIELDS

(71) Applicant: PARANETICS, INC., San Diego, CA (US)

(72) Inventors: Thomas A. Daniel, San Diego, CA (US); Larry Stambaugh, San Diego, CA (US)

(73) Assignee: PARANETICS, INC., San Diego, CA (US)

( * ) Notice: Subject to any disclaimer, the term of this patent is extended or adjusted under 35 U.S.C. 154(b) by 611 days.

This patent is subject to a terminal disclaimer.

(21) Appl. No.: 17/193,917

(22) Filed: Mar. 5, 2021

(65) Prior Publication Data

US 2021/0193357 A1  Jun. 24, 2021

Related U.S. Application Data

(63) Continuation of application No. 15/001,187, filed on Jan. 19, 2016, now abandoned.

(51) Int. Cl.
*H01F 7/02* (2006.01)
*F16C 32/04* (2006.01)
(Continued)

(52) U.S. Cl.
CPC ....... *H01F 7/0231* (2013.01); *F16C 32/0423* (2013.01); *H01F 6/00* (2013.01);
(Continued)

(58) Field of Classification Search
CPC ...... F16C 32/0423; H01F 7/0273; H02K 1/06
(Continued)

(56) References Cited

U.S. PATENT DOCUMENTS 4,568,901 A  2/1986 Adam
4,998,084 A  3/1991 Alff
(Continued)

FOREIGN PATENT DOCUMENTS

CN  107078621 A  8/2017
EP    3204635 A2  8/2017
(Continued)

OTHER PUBLICATIONS

Chinese Office Action from corresponding Chinese Patent Application No. 2016800787828 mailed Mar. 2, 2020 (10 pages).
(Continued)

*Primary Examiner* — Alexander Talpalatski
(74) *Attorney, Agent, or Firm* — Buchalter, a Professional Corporation

(57) ABSTRACT

Embodiments described herein provide devices, systems, and techniques for generating a magnetic field pattern that includes a plurality of magnetic poles. In specific embodiments, a magnetic device is disclosed which generates a magnetic field pattern including two magnetic poles of the same polarity on both ends, or sides of the magnetic device, and a third magnetic pole of a different polarity from the other two magnetic poles, wherein the third magnetic pole is located inside the magnetic device and between the other two magnetic poles. Moreover, the magnetic device is configured with two openings located at the two transition boundaries/interfaces of the three-pole magnetic field. As such, the two transition boundaries become accessible to objects. In particular, when another magnet is inserted at an interface between two magnetic poles, the magnet will "register" right at the interface and hover over or be suspended at the opening of the magnetic device.

19 Claims, 14 Drawing Sheets

(51) Int. Cl.
*H01F 6/00* (2006.01)
*H01F 7/06* (2006.01)
*H02K 1/06* (2006.01)
*H02K 53/00* (2006.01)

(52) U.S. Cl.
CPC ............ *H01F 7/0273* (2013.01); *H01F 7/06* (2013.01); *H02K 1/06* (2013.01); *H02K 53/00* (2013.01); *Y10S 74/09* (2013.01)

(58) Field of Classification Search
USPC .......................................................... 310/46
See application file for complete search history.

(56) References Cited

U.S. PATENT DOCUMENTS

| | | | |
|---|---|---|---|
| 5,182,533 A | 1/1993 | Ritts | |
| 5,502,425 A | 3/1996 | Tsai | |
| 5,523,732 A | 6/1996 | Leupold | |
| 6,084,494 A | 7/2000 | Chew et al. | |
| 6,401,872 B1 * | 6/2002 | Morishita | B66B 7/042 187/292 |
| 6,510,925 B1 * | 1/2003 | De Jong | B66B 7/044 187/409 |
| 6,758,146 B2 | 7/2004 | Post | |
| 6,822,441 B1 | 11/2004 | Moreno et al. | |
| 6,979,925 B2 * | 12/2005 | Schwamm | H02K 21/24 310/266 |
| 7,501,922 B2 | 3/2009 | Kazadi | |
| 7,531,929 B2 | 5/2009 | Tong et al. | |
| 7,924,128 B2 * | 4/2011 | Ito | B66B 1/3476 335/229 |
| 8,338,976 B2 | 12/2012 | Kazadi | |
| 8,350,663 B1 | 1/2013 | Michael | |
| 8,638,186 B1 | 1/2014 | Lapoint | |
| 8,850,989 B2 * | 10/2014 | Hunter | B60L 13/04 310/90.5 |
| 9,336,935 B2 * | 5/2016 | Michaelis | H01F 7/0236 |
| 9,419,483 B2 * | 8/2016 | Hunstable | H02K 1/2766 |
| 9,831,752 B2 * | 11/2017 | Dien | H02K 21/12 |
| 2007/0205854 A1 * | 9/2007 | Kazadi | H01F 7/0236 335/306 |
| 2008/0100163 A1 | 5/2008 | Storaasli | |
| 2008/0174119 A1 * | 7/2008 | Hu | F16C 39/066 290/55 |
| 2009/0179505 A1 * | 7/2009 | Hoppe | H02K 41/031 310/12.17 |
| 2009/0261675 A1 | 10/2009 | Hsiao et al. | |
| 2011/0062716 A1 | 3/2011 | Zeuthen et al. | |
| 2014/0111047 A1 * | 4/2014 | Hashish | H02K 7/09 310/90.5 |
| 2014/0319954 A1 | 10/2014 | Dien | |
| 2015/0001976 A1 | 1/2015 | Hunstable | |
| 2015/0042427 A1 | 2/2015 | Kocijan | |
| 2015/0213934 A1 | 7/2015 | Michaelis | |
| 2017/0284365 A1 * | 10/2017 | Yañez Villarreal | H02K 35/02 |

FOREIGN PATENT DOCUMENTS

| | | |
|---|---|---|
| JP | 2007214393 A | 8/2007 |
| KR | 1020140110882 A | 9/2014 |
| WO | 2014016575 A1 | 1/2014 |

OTHER PUBLICATIONS

Extended European Search Report for related European Application No. EP 16886772 mailed on Aug. 13, 2019 (8 pages).
International Search Report and Written Opinion received in PCT/US2016/060858, mailed Feb. 23, 2017, 8 pages.
Office Action from corresponding Chinese Patent Application No. 2016800787828 mailed Aug. 18, 2020, in 13 pages.
Examination report from corresponding Australian Patent Application No. 2016387354 mailed Sep. 23, 2020, in 5 pages.
Notice of Allowance for related U.S. Appl. No. 15/603,187, dated Oct. 29, 2020, in 16 pages.
Extended European Search Report for EP App No. 13174653.8 dated Dec. 18, 2023, 7 pgs.
Office Action for CA App No. 3,011,045 dated Feb. 1, 2024, 4 pgs.
Office Action for AU App No. 2023201402 dated Feb. 23, 2024, 3 pgs.

* cited by examiner

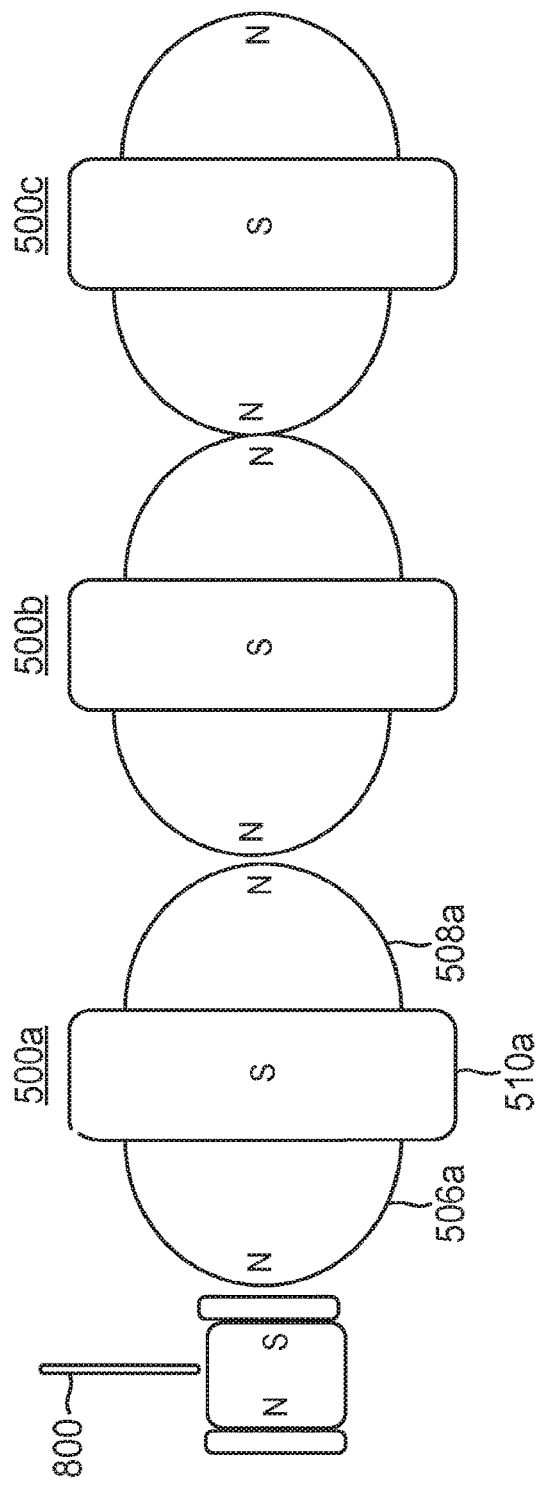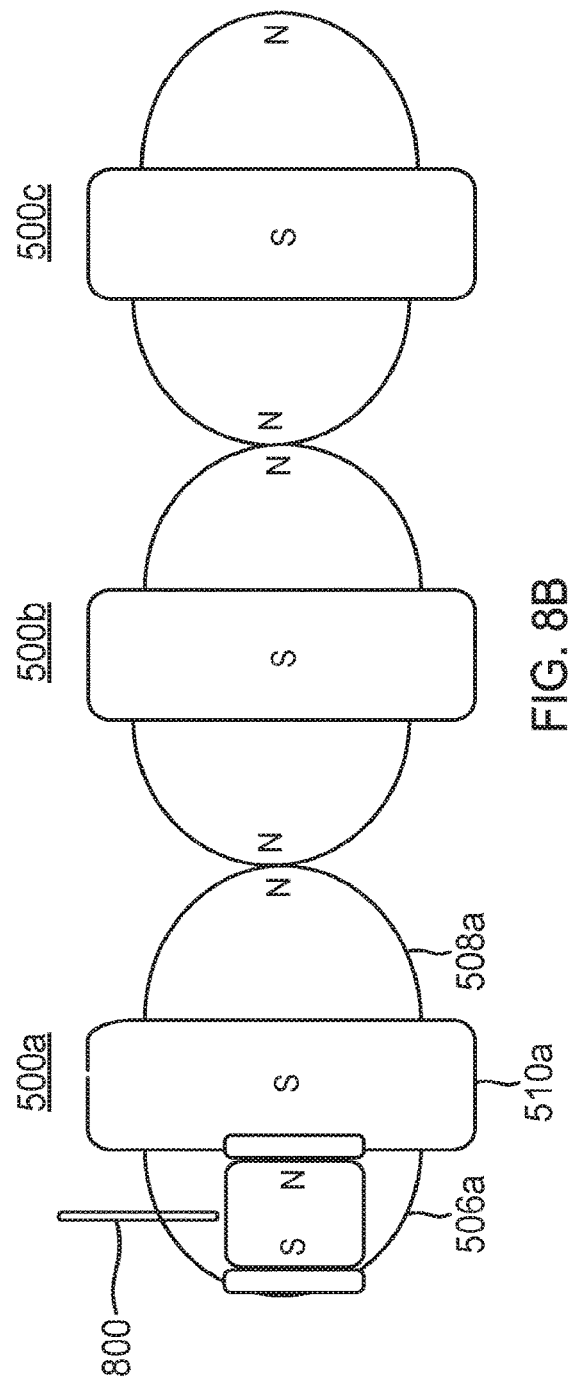

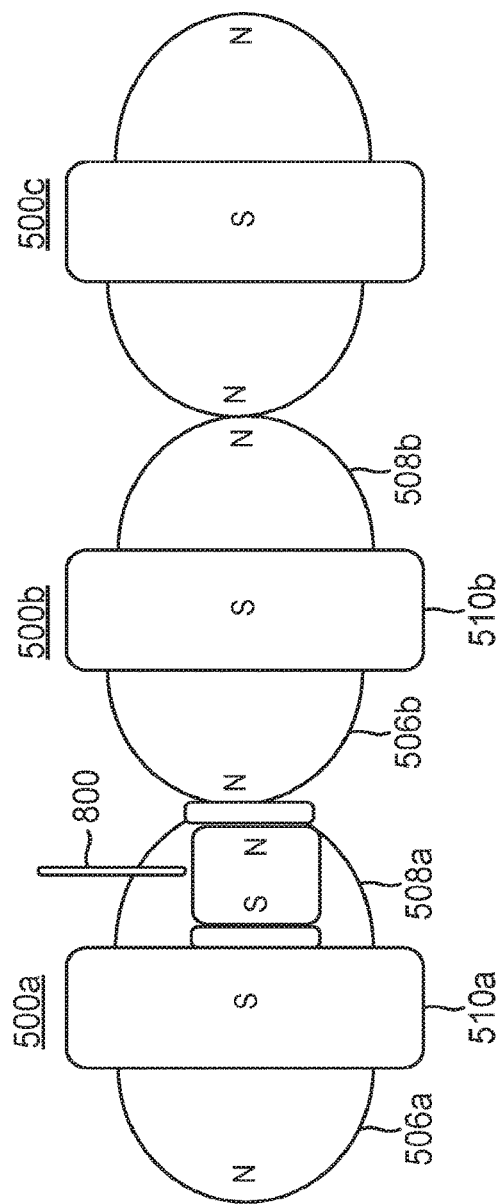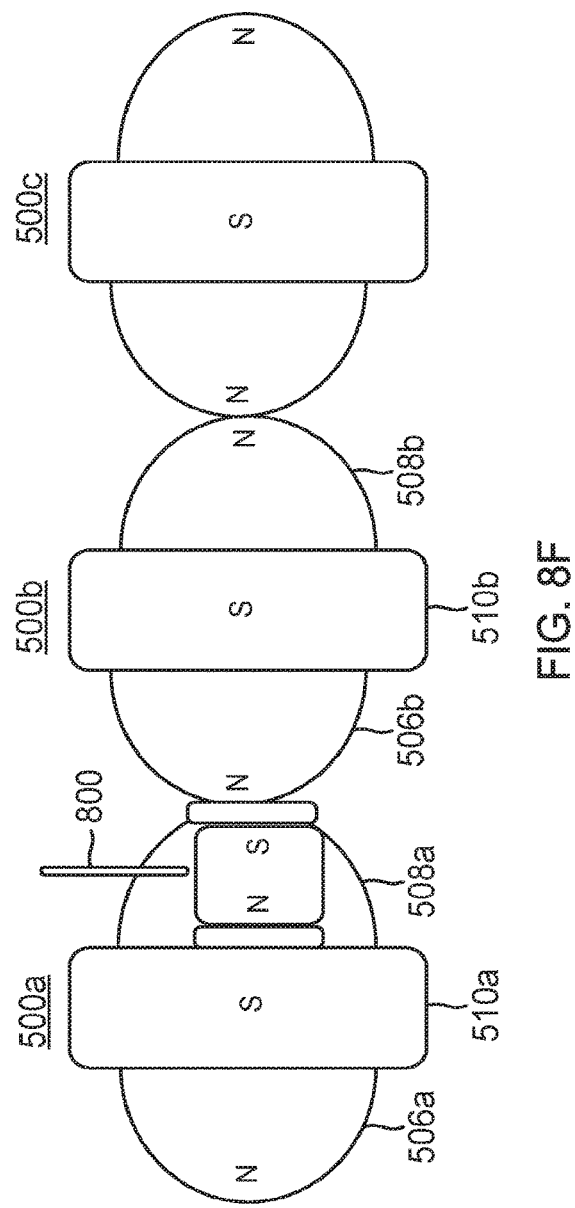
FIG. 8E
FIG. 8F

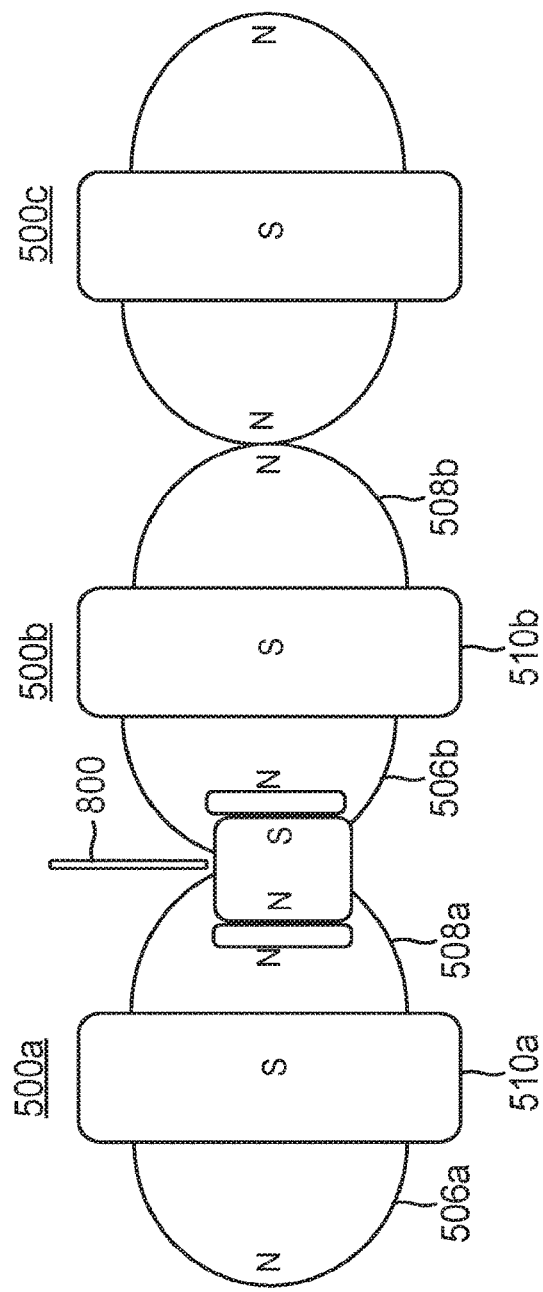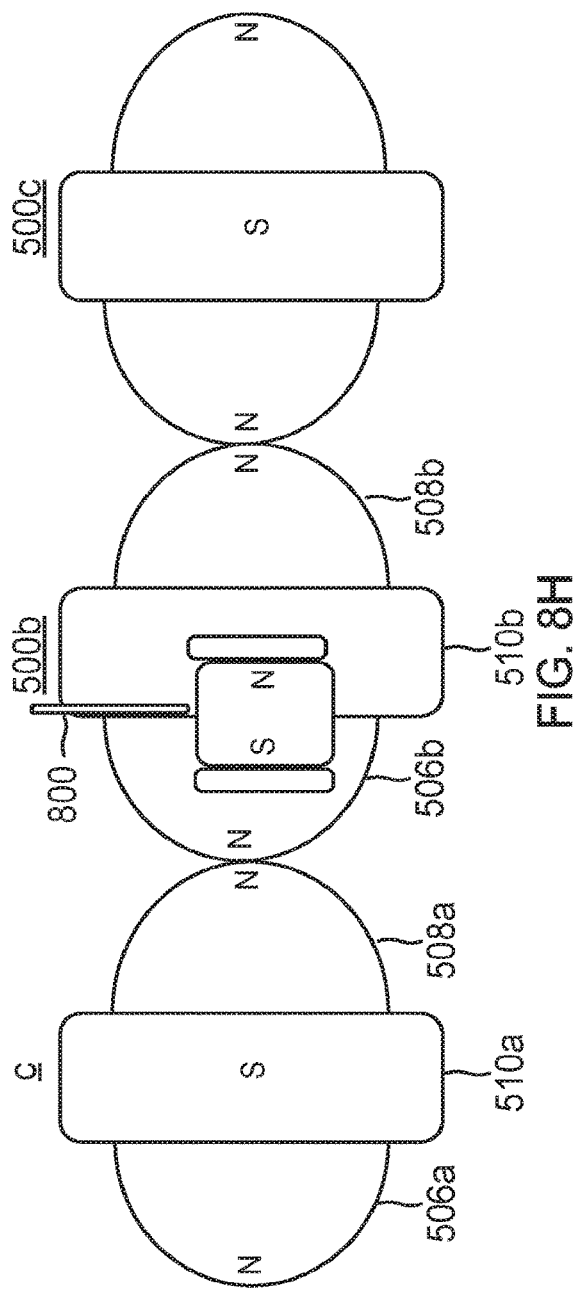

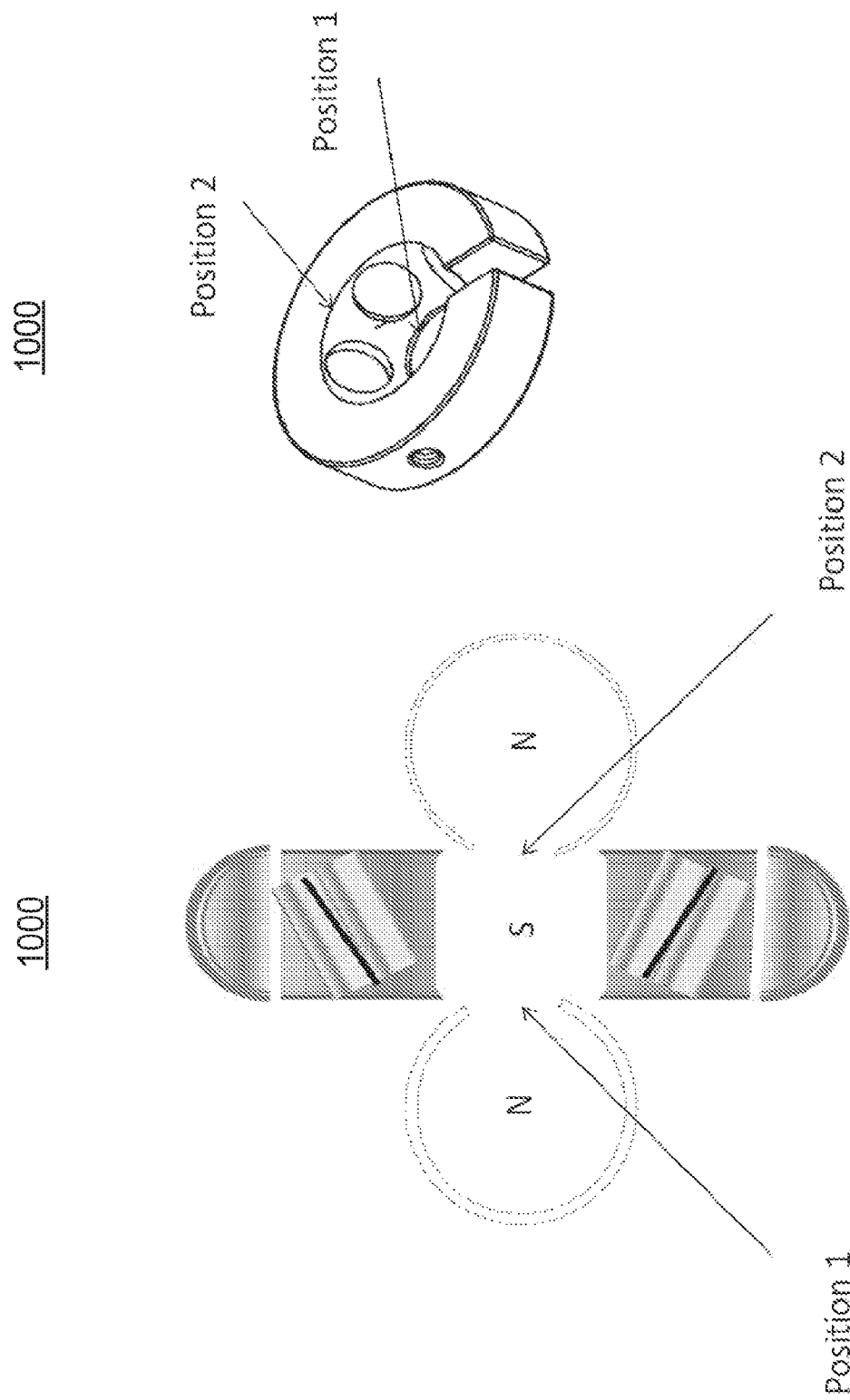

METHODS AND APPARATUS FOR GENERATING MAGNETIC FIELDS

CROSS REFERENCE TO RELATED APPLICATIONS

This application is a continuation of U.S. patent application Ser. No. 15/001,187 filed on Jan. 19, 2016, all of which are incorporated here as if set forth in full.

BACKGROUND

Field of the Invention

The embodiments described herein are related to generating magnetic fields, and more particularly to the generation of magnetic fields with multiple polarities.

Background of the Invention

Magnets of all kinds, e.g., permanent, electromagnetic, and superconducting magnets generate two magnetic poles of opposite polarity at opposite sides. This can be illustrated by reference to the bar magnet 100 shown in FIG. 1. As can be seen in FIG. 1, bar magnet 100 has two magnetic poles: south pole 102 and north pole 104, respectively. FIG. 1 also shows magnetic field 106 generated by bar magnet 100 which has a direction going from the north pole 104 to south pole 102.

These magnetic poles have the ability to repel and attract. For example, if the north pole of a second bar magnet is to be brought near, e.g., the south pole 102 of magnet 100, then magnet 100 would attract the second magnet. Conversely, if the south pole of the second magnet is to be brought near the south pole 102 of magnet 100, then magnet 100 would repel the second magnet. The north pole 104 of magnet 100 will operate in a converse fashion, i.e., repelling the north pole and attracting the south pole of the second magnet.

While the above described property of magnets can be used to create devices, it can also limit their uses or at least limit their efficiency. This can be illustrated by a stator/rotator combination of an electric motor.

FIG. 2 presents a block diagram illustrating multiple magnets 202 forming a stator ring, and a rotator magnet 204 positioned in the middle of the stator ring. As can be seen in FIG. 2, each of the magnets 202 (i.e., 202a-202d) has the south and north magnetic poles arranged as indicated, and the rotator magnet 204 has its poles arranged as shown. During operation, the south poles of stator magnets 202a and 202d will repel the south pole of rotator magnet 204, while the north poles of stator magnets 202b and 202c will attract the south pole of rotator magnet 204. At the same time, the north poles of stator magnets 202b and 202c will repel the north pole of rotator magnet 204 while the south poles of stator magnets 202d and 202a will attract the north pole of rotator magnet 204. The cumulative effect causes rotator magnet 204 to rotate clockwise around a shaft 205. Unfortunately, as can be seen in FIG. 2, each of stator magnets 202 generates a second pole on the outside of the stator ring that is not used. As a result, the overall utilization of the stator's available magnetic fields is 50% at best.

SUMMARY

Embodiments described herein provide devices, systems, and techniques for generating a magnetic field pattern that includes a plurality of magnetic poles. In specific embodiments, a magnetic device is disclosed which generates a magnetic field pattern including two magnetic poles of the same polarity on both ends, or sides of the magnetic device, and a third magnetic pole of a different polarity from the other two magnetic poles, wherein the third magnetic pole is located inside the magnetic device and between the other two magnetic poles. This three-pole magnetic field pattern can be used to accelerate a magnet or another magnetic device from one side of the magnetic device to the other side of the magnetic device.

In various embodiments, multiple of the disclosed magnetic devices can be arranged in series or linked with one another to generate a combined magnetic field pattern that comprises multiple of the three-pole magnetic field pattern. This combined magnetic field pattern can be used to accelerate another magnet device over a longer distance in a linear path or around a fly wheel of a magnetic rotor-stator device in a circular path.

In various embodiments, the magnetic device which generates the three-pole magnetic field is configured with two openings located at the two transition boundaries/interfaces of the three-pole magnetic field. As such, the two transition boundaries become accessible to objects. In particular, when another magnet is inserted at an interface between two magnetic poles, the magnet will "register" right at the interface and hover over or be suspended at the opening of the magnetic device. The combination of such a magnet and the magnetic device can be used to create transducers, valves, speakers, microphones, and pumps.

In one aspect, a magnetic device for generating a desired magnetic field pattern is disclosed. This magnetic device includes a base that includes an upper surface, a lower surface, and an inner wall and an outer wall that are sandwiched between the upper surface and the lower surface. The upper surface includes a first opening defined by the upper edge of the inner wall, the lower surface includes a second opening defined by the lower edge of the inner wall. The base further includes a set of magnet placement locations located between the inner wall and the outer wall. The magnetic device further includes a set of magnets placed at these placement locations such that each of the magnets is placed at a location on the inner wall such that an axis of the magnet connecting the north pole and the south pole of the magnet forms an angle with respect to the upper and lower surfaces. As a result of the device configuration, the magnetic device generates three primary fields: a first field of a first polarity formed substantially between the upper surface and the lower surface inside the base, a second field of a second polarity formed outward from the first opening of the base and on a first side of the first field, and a third field of the second polarity formed outward from the second opening of the base and on a second side of the first field opposite to the first side. As such, the two transition boundaries become accessible to objects. In particular, when another magnet is inserted at an interface between the two magnetic poles, the magnet will "register" right at the interface and hover over or be suspended at the interface between the two magnetic poles. The combination of such a magnet and the magnetic device can be used to create transducers, valves, speakers, microphones, and pumps.

In some embodiments, the set of magnet placement locations includes two locations.

In some embodiments, the set of magnet placement locations includes three or more locations.

In some embodiments, the set of magnets forms a continuous magnetic structure around the inner wall.

In some embodiments, an upper portion of each of the magnet placement locations is thinner than a lower portion of the magnet placement location.

In some embodiments, each magnet within the set of magnets includes a surface in the vicinity of the inner wall which has an angular shape.

In some embodiments, the set of magnet placement locations are substantially flat on the inner wall and configured to accommodate surface mounting magnets.

In some embodiments, the region of magnetic influence of the second field is significantly larger than the region of magnetic influence of the third field.

In some embodiments, the sizes and geometries of the first and second openings are configured to control the region of magnetic influence of each of the second field and the third field.

In some embodiments, the north pole of each magnet faces the center of the base whereas the south pole of the magnet faces away from the center of the base. Moreover, the first field of the first polarity is magnetic south and the second field and the third field of the second polarity is magnetic north.

In some embodiments, the south pole of each magnet faces the center of the base whereas the north pole of the magnet faces away from the center of the base. Moreover, the first field of the first polarity is magnetic north and wherein the second field and the third field of the second polarity is magnetic south.

In some embodiments, the first pole of each magnet facing the center of the base is positioned closer to the upper surface of the base while the second pole of the magnet facing away from the center of the base is positioned closer to the lower surface of the base.

In some embodiments, the angle formed between the axis of each magnet connecting the north pole and the south pole of the magnet, and the upper and lower surfaces is between 0 and 90 degrees.

In some embodiments, the inner wall of the base has a parabolic shape or an angled shape.

In some embodiments, a surface of each magnet has a parabolic shape, an angular shape or a flat shape.

In some embodiments, the first field of the first polarity is located substantially within the space surrounded by the first opening, the second opening, and the inner wall.

In some embodiments, a first transition boundary between the first field of the first polarity and the second field of the second polarity is in the vicinity of the first opening of the base, and wherein a second transition boundary between the first field and the third field of the second polarity is in the vicinity of the second opening of the base.

In some embodiments, each of the first and second transition boundaries is accessible to an object such that when a magnet is inserted at the first or the second transition boundary, the magnet hovers over the corresponding opening of the magnetic device.

In some embodiments, the magnetic device is configured such that if a pressure is applied to the hovering magnet and then released, the magnet inclines to return to substantially the same location.

In some embodiments, the combination of the magnet and the magnetic device is used to create transducers, valves, speakers, microphones, and pumps.

In some embodiments, each of the magnets is a permanent magnet, an electromagnetic magnet, a superconducting magnet, or a combination of the above.

In some embodiments, the base further includes a gap formed into the base which connects the space in the center of the base and the space outside the base.

In another aspect, a device for propelling a magnetic object from a first location to a second location is disclosed. This device includes a first magnetic field generator configured to generate a first magnetic field pattern that comprises a first magnetic field of a first polarity, and a second magnetic field and a third magnetic field both of a second polarity and located on either side of the first magnetic field. The device also includes a second magnetic field generator coupled in series with the first magnetic field generator and configured to generate a second magnetic field pattern which is substantially identical to the first magnetic field pattern. The first and the second magnetic field patterns form a combined linear field pattern having first-second-first-first-second-first polarities. The combined linear field pattern causes a magnetic object to enter from a first end of the combined linear field pattern, traverse each of the magnetic field in the combined linear field pattern, and exit from a second end of the combined linear field pattern, as a result of the magnetic interaction between the magnetic object and the combined linear field pattern.

In some embodiments, the first polarity is magnetic north and the second polarity is magnetic south.

In some embodiments, the first polarity is magnetic south and the second polarity is magnetic north.

In some embodiments, each of the first and second magnetic field generators includes a base including an upper surface, a lower surface, and an inner wall and an outer wall that are sandwiched between the upper surface and the lower surface. The upper surface includes a first opening defined by the upper edge of the inner wall, the lower surface includes a second opening defined by the lower edge of the inner wall. Each magnetic field generator also includes a set of magnets placed to cover a portion of the inner wall, and each of the magnets is positioned such that an axis of the magnet connecting the north pole and the south pole of the magnet forms an angle with respect to the upper and lower surfaces.

In some embodiments, the set of magnets are placed inside a set of recessed locations within the inner wall of the base.

In some embodiments, the set of magnets are mounted on the surface of the inner wall of the base.

In some embodiments, each of the set of magnets has a trapezoid, circular, square, and/or triangular geometry.

In some embodiments, the set of magnets includes two or more magnets.

In some embodiments, the first magnetic field of a first polarity is formed substantially between the upper surface and the lower surface inside the base, the second magnetic field of the second polarity is formed outward from the first opening of the base, and the third magnetic field of the second polarity is formed outward from the second opening of the base and on the opposite side of the first magnetic field.

In some embodiments, the device includes one or more additional magnetic field generators coupled in series with the first and second magnetic field generators and configured to generate one or more additional magnetic field patterns which are substantially identical to the first and second magnetic field patterns.

In some embodiments, the first, the second, and the one or more additional magnetic field generators form a linear array for propelling the magnetic object in a linear path.

In some embodiments, the first, the second, and the one or more additional magnetic field generators form a circular array for propelling the magnetic object in a circular path.

These and other features, aspects, and embodiments are described below in the section entitled "Detailed Description."

BRIEF DESCRIPTION OF THE DRAWINGS

Features, aspects, and embodiments are described in conjunction with the attached drawings, in which:

FIG. 8A illustrates the initial position of the electromagnetic device before entering the first north pole of field pattern 500*a*.

FIG. 8B illustrates the electromagnetic device completely enters the first north pole field after being attracted by the first north pole of field pattern 500*a*.

FIG. 8E illustrates the electromagnetic device has entered the second north pole field 508*a* in field pattern 500*a* and the polarities of device 800 remain the same.

FIG. 8F illustrates the electromagnetic device has again switched polarities from south-north back to north-south.

FIG. 8G illustrates the electromagnetic device moves into the first north pole field of the second field pattern 500*b* after switching the polarities.

FIG. 8H illustrates the electromagnetic device has switched polarities again from north-south back to south-north to facilitate the device to move across the second south pole field of field pattern 500*b*.

FIG. 10A shows a cross-sectional view of another example of the proposed magnetic device which includes two similar sizes openings and the associated field pattern with three poles in accordance with some embodiments described herein.

FIG. 10B shows a perspective view of the magnetic device having the two transition boundaries at the two openings in accordance with some embodiments described herein.

DETAILED DESCRIPTION

Some embodiments described herein relate to apparatus or devices that comprise a plurality of magnets positioned to form a parabolic shape. The magnets can be permanent magnets, electromagnetic magnets, superconducting magnets, or some combination of the above. When the magnets are positioned in the parabolic shape as described herein, they can generate two primary fields of magnetic force of the same polarity extending outward from the apparatus in opposite directions and a third magnetic field substantially in the center of the apparatus of an opposite polarity.

Figure 3:
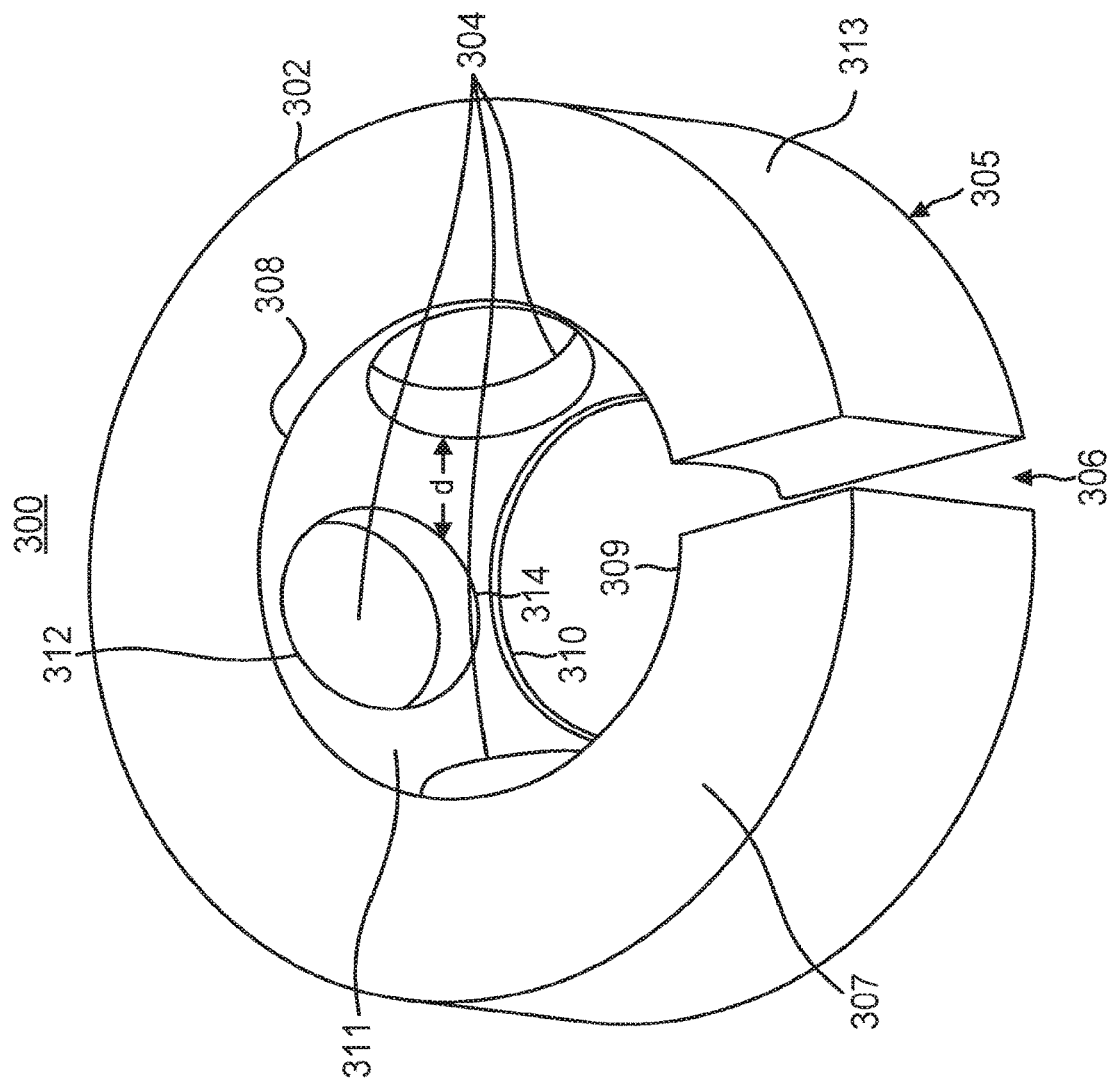
FIG. 3 illustrates an exemplary device which can be used to form a proposed magnetic device for producing a desired magnetic field pattern in accordance with some embodiments described herein.

FIG. 3 illustrates an exemplary device 300 which can be used to form a proposed magnetic device for producing a desired magnetic field pattern in accordance with some embodiments described herein. As can be seen in FIG. 3, device 300 comprises a base 302 that has a ring geometry that includes at least two openings. More specifically, base 302 has an upper surface 307, a lower surface 305, an inner wall 311 defining the central opening or hole through the ring-shaped base between surfaces 305 and 307, and an outer wall 313 sandwiched between the surfaces 305 and 307. Upper surface 307 further includes an opening 308, in this case having a circular shape, while lower surface 305 includes an opening 310 which also has a circular shape in the illustrated example. Notably, opening 308 in upper surface 307 has a larger diameter than opening 310 in lower surface 305. As a result, inner wall 311 can have a parabolic shape or an angled shape. Although base 302 in the embodiment of FIG. 3 is shown to have a ring/circular shape, other embodiments of device 300 can have a base that has other closed shapes with a non-circular opening, for example, including but are not limited square, pentagon, hexagon, or other polygon shaped opening. Hence, embodiments of this disclosure are not limited to using ring-shaped bases shown in FIG. 3.

Base 302 further includes a plurality of magnet placement locations 304 that can each accommodate a magnet. As can be seen in FIG. 3, the plurality of magnet placement locations 304 are located between inner wall 311 and outer wall 313, and spaced substantially evenly around the ring-shaped base 302. For example, the distance between a pair of adjacent magnet placement locations can be denoted as "d." However, in some other embodiments, the plurality of magnet placement locations 304 can be positioned around the ring-shaped base 302 with uneven spacings. Note that each magnet placement location 304 includes an opening on the inner wall 311 to receive a magnet. As such, the opening of each magnet placement location 304 can also have a parabolic shape or an angled shape if the inner wall 311 has a parabolic shape or an angled shape. In such embodiments, due to the parabolic or angled shape of inner wall 311, each of the magnet placement locations 304 can have an upper portion 312 that is thinner than a lower portion 314.

In some embodiments, the back wall of each magnet placement location 304, which is embedded inside the solid portion of base 302, can be set at an angle with respect to the outer wall 313 of base 302. In these embodiments, the surface of the magnets to be installed into the magnet placement locations 304 can also have a parabolic or angled shape. In some embodiments, instead of using magnet placement locations configured as recesses into the inner wall, a base of the proposed magnetic device uses a set of magnet placement locations around the inner wall. These magnet placement locations can be used to accommodate surface mounting magnets, as is described in more detail below in conjunction with FIGS. 9A and 9B.

In some embodiments, base 302 also includes a gap 306 formed into the solid ring structure of base 302 which connects the center of base 302 to the space outside base 302. The function and use of such a gap 306 is described in more detail below. Although not explicitly shown, each magnet placement location 304 can accommodate a magnet. A proposed magnetic device 300 is formed when magnets are properly installed into the magnet placement location 304.

Figure 1:
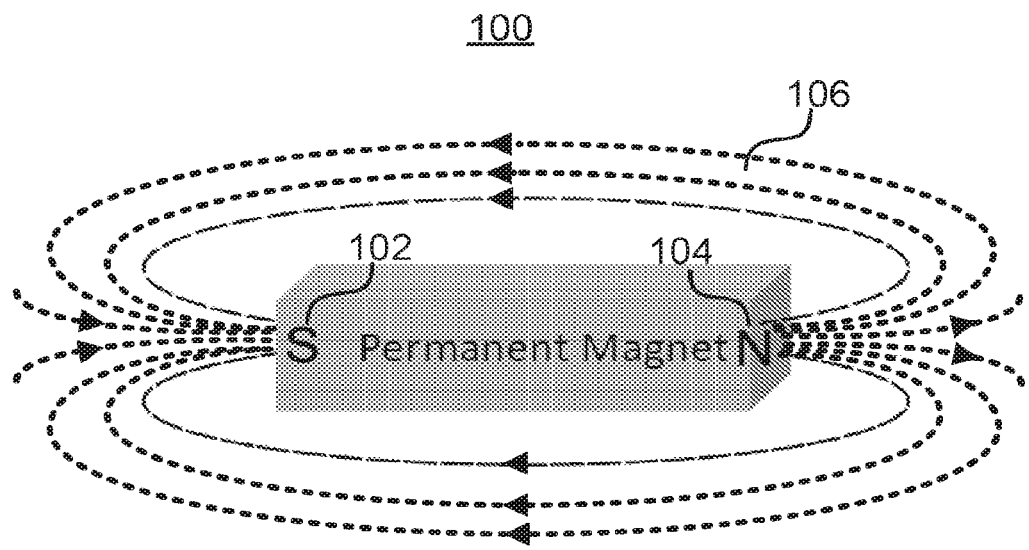
FIG. 1 illustrates a conventional bar magnet having two poles.
Figure 2:
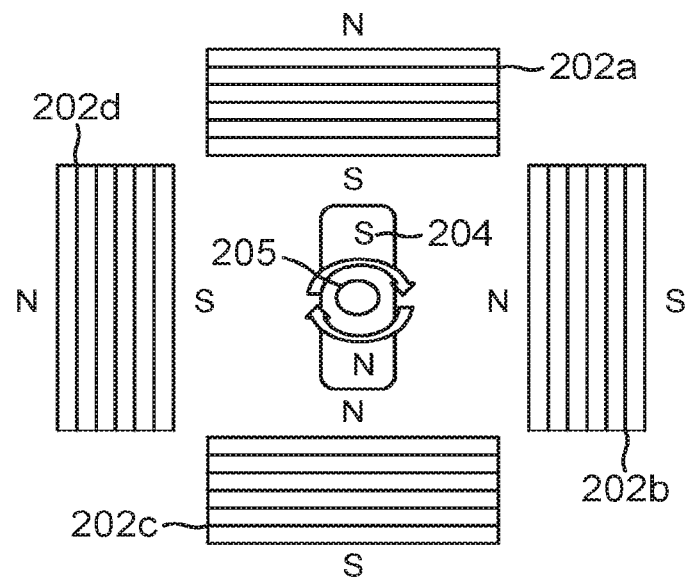
FIG. 2 presents a block diagram illustrating multiple magnets forming a stator ring, and a rotator magnet positioned in the middle of the stator ring.
Figure 4B:
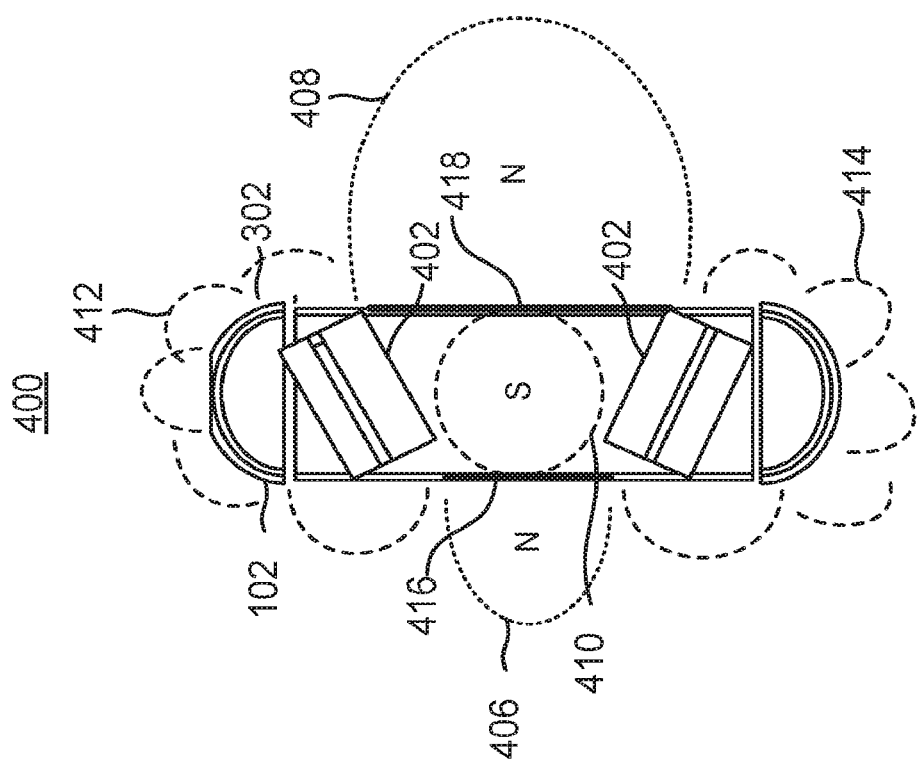
FIG. 4B illustrates exemplary field patterns actually generated by the magnet configuration of the device vs. the expected field patterns shown in FIG. 4A.
Figure 4A:
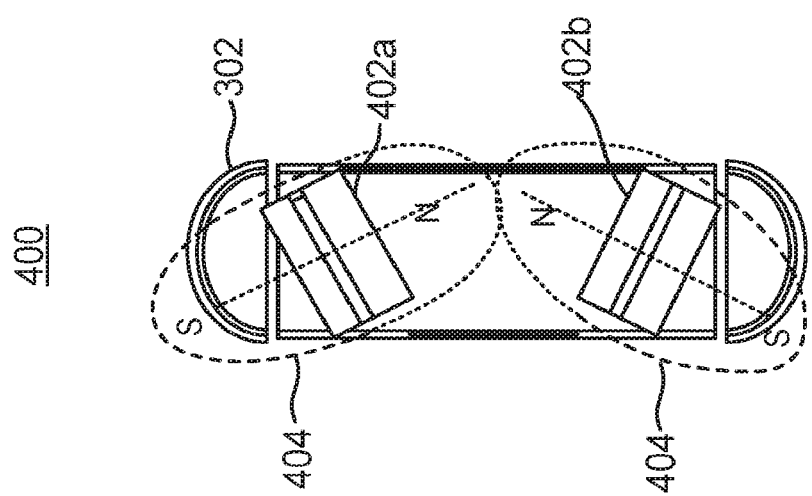
FIG. 4A illustrates a magnetic device with a set of magnets installed in the magnet placement locations of the base described in FIG. 3, and field patterns that would be expected to be produced given the field patterns shown in FIG. 1.

FIG. 4A illustrates a magnetic device 400 with a set of magnets 402 (i.e., 402a and 402b) installed in the magnet placement locations 304 of base 302 described in FIG. 3, and field patterns that would be expected to be produced given the field patterns shown in FIG. 1. Notably, in the exemplary device 400, the north pole of each magnet 402 faces the center of base 302 and is positioned closer to the upper surface of the base 302, while the south pole of each magnet 402 faces away from the center of base 302 and is positioned closer to the lower surface of base 302. As such, each of the magnets 402 is placed such that an axis of the magnet (shown as the dotted straight lines passing through the magnets 402) connecting the north pole and the south pole of the magnet forms an angle with respect to the upper and lower surfaces, and the axis of each magnet is also at an angle to the central axis of the central opening through the ring-shaped base. In various embodiments, the set of magnets can include two, three, or more individual permanent magnets. In some embodiments, the set of magnets forms a continuous magnetic structure around the inner wall.

In the device configuration shown in FIG. 4A, it would be expected that the magnets would generate magnetic fields 404 with poles as shown, i.e., a combined north pole formed in the middle of device 400 and two south poles formed at the opposite ends of device 400. However, the field pattern shown in FIG. 4A is not what is actually produced by device 400 based on the described configuration.

FIG. 4B illustrates exemplary field patterns actually generated by the magnet configuration of device 400. More specifically, FIG. 4B represents a cross-sectional view of device 400, such that the right vertical edge of device 400 corresponds to the upper surface 307 of base 302 shown in FIG. 3, while the left vertical edge of device 400 corresponds to the lower surface 305 of base 302 shown in FIG. 3. As can be seen in FIG. 4B, three primary magnetic fields, 406, 408, and 410 are produced. More specifically, the first primary field 410 having a polarity of magnetic south, instead of magnetic north, is formed substantially in the middle of base 302. In the example shown, field 410 is located substantially within the open space surrounded by the upper opening in the upper surface, the lower opening in the lower surface, and the inner wall of based 302.

Also shown in FIG. 4B, a second primary field 408 having a polarity of magnetic north is formed outward from the upper, i.e., the larger opening of the base 302, and a third primary field 406 having a polarity also of magnetic north is formed outward from the lower or the smaller opening of the base 302 and on the opposite side of the primary field 410.

In some embodiments, a boundary between the first primary field 410 and the second primary field 408 is in the vicinity of the larger opening of the base 302 (shown as the dark vertical line on the right), and a boundary between the first primary field 410 and the third primary field 406 is in the vicinity of the smaller opening of the ring-shaped base 302 (shown as the dark vertical line on the left). Also note that, because opening 308 is greater in size than opening 310 (also indicated by the two dark lines 416 and 418 in FIG. 4B), the region of magnetic influence of the second magnetic field 408 may be significantly larger than the region of magnetic influence of the third magnetic field 406. In some embodiments, the openings 308 and 310 of base 302 can be configured to desired sizes and geometries for controlling the region of magnetic influence of each of the second magnetic field 408 and the third magnetic field 406.

While the exemplary device 400 is configured to form one magnetic south pole between two magnetic north poles, alternative designs of device 400 can install the magnets in reverse of the configuration shown in FIG. 4B. In such designs, three primary magnetic fields, 406', 408', and 410' are produced such that the first primary field 410' of magnetic north is formed substantially in the middle of the base 302 while the second primary field 408' and the third primary field 406' of magnetic south are formed on either side of the first primary field 410'.

Figure 5:
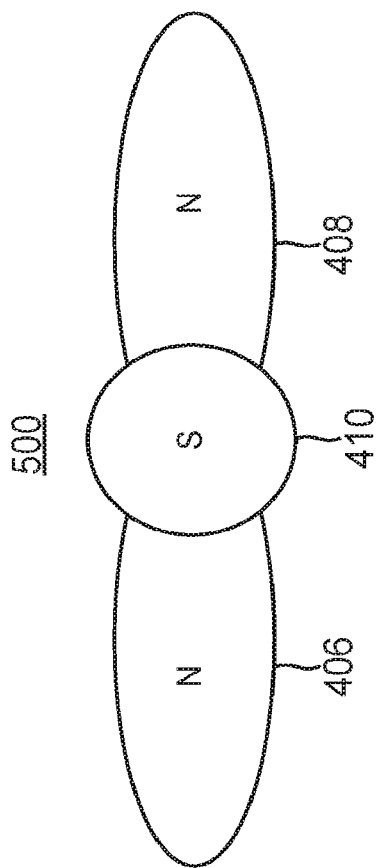
FIG. 5 illustrates an approximated field pattern of the proposed magnetic device comprising the three primary fields in accordance with some embodiments described herein.

Also shown in FIG. 4B, there can be some additional field effects 412 and 414 in additional to the three primary fields 406-410. However, for purposes of the discussion herein, the fields generated by device 400 can be approximated by the three primary fields described above. FIG. 5 illustrates an approximated field pattern 500 of the magnetic device 400 comprising the three primary fields 406-410 in accordance with some embodiments described herein. As shown in FIG. 5, the field pattern 500 generated by device 400 includes two north poles located on both sides and one south pole located in between the two north poles. The field characteristics of the disclosed device 400 can be used in various applications to achieve various benefits, e.g., when used in an electric motor, to improve the efficiency of the electric motor.

Figure 6:
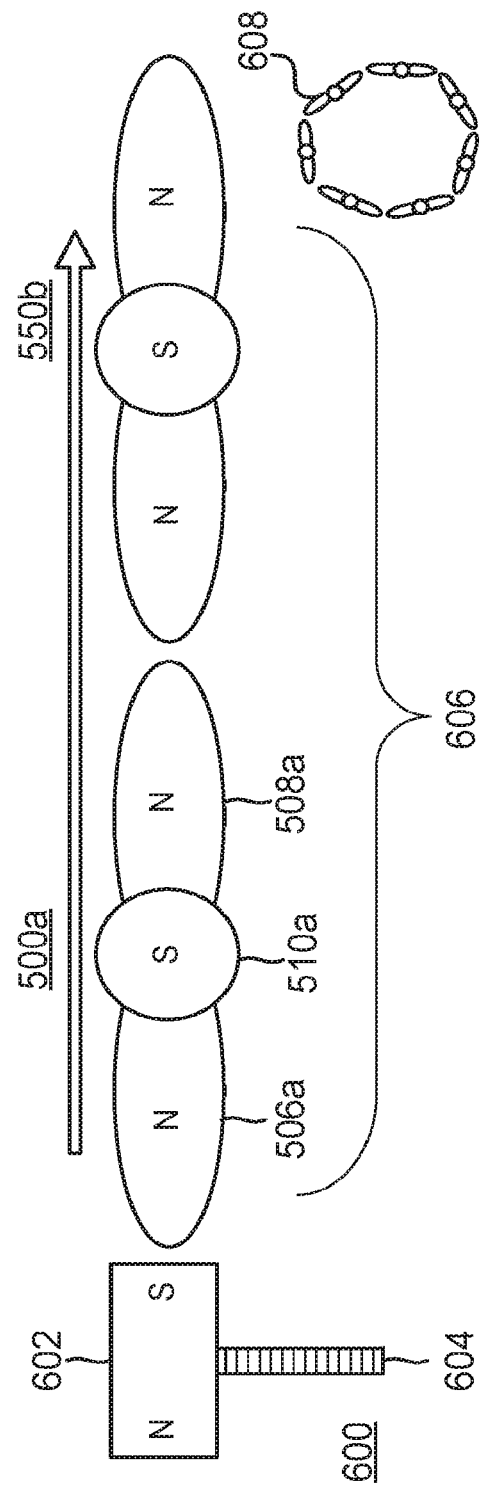
FIG. 6 illustrates an exemplary process of accelerating a device comprising a magnet attached to a rod or other stabilizing apparatus through a magnetic field formed by multiple field patterns shown in FIG. 5 in accordance with some embodiments described herein.

As described above in conjunction with FIG. 3, base 302 of devices 300 or 400 can also include a gap 306 within the base 302. Such a gap can be used in exemplary applications to accelerate another magnet. FIG. 6 illustrates an exemplary process of accelerating a device 600 comprising a magnet 602 attached to a rod 604 or other stabilizing apparatus through a magnetic field 606 formed by multiple field patterns 500 shown in FIG. 5 in accordance with some embodiments described herein.

More specifically, magnetic field 606 comprises an array of field patterns 500a and 500b, each of which is generated by an instance of the device 400 in FIGS. 4A and 4B comprising a based 302 and a set of magnets 402. Note that, the array of devices 400 that generates magnetic field 606 can be placed in series, or linked with one another. While only two field patterns 500a and 500b are shown, much more than two instances of device 400 can be put together to form a longer array of device 400 generating a corresponding longer array of field patterns 500 to accelerate magnet 600 over a longer distance. For example, this longer array of device 400 can be configured in a circular pattern as shown in the inset of FIG. 6, which includes seven instances of field pattern 500. In this example, the magnet 602 can be accelerated/propelled in a circular motion around the circular path 608. In another example, multiple field patterns 500 can be configured in a linear fashion to accelerate/propel the magnet 602 in a straight line path (not shown). In all these examples, when the magnet 602 travels through the array of field patterns 500, the relatively narrow rod 604 can pass through each gap 306 of each base 302 of each instance of device 400, while the wider magnet 602 passes through the opening of each base 302 in the middle of base 302.

We now look at how the magnet 602 accelerates through field 606 in more detail. As can be seen in FIG. 6, when the magnet 602 is initially positioned on the left of field pattern 500a, the south pole of magnet 602 will be attracted to the north pole of field 506a of field pattern 500a. This interaction can cause device 600 to accelerate to the right in FIG. 6. As magnet 602 enters field 506a, field 506a begins to repel the north pole of magnet 602, causing further acceleration of magnet 602 to the right. If the magnet 602 is initially accelerated enough to overcome the repelling effect of the south pole, i.e., field 510a of field pattern 500a on the south pole of magnet 602, then field 510a will start to repel the south pole of magnet 602 while continues to attract the north pole of magnet 602. Meanwhile, the second north pole, i.e., field 508a of field pattern 500a begins to attract the south pole of magnet 602. Once magnet 602 enters field 508a, field 508a will start to repel the north pole of magnet 602 so that magnet 602 continues to accelerate to the right to exit field pattern 500a.

Thus, the interaction between the three primary fields in field pattern 500a and the poles of magnet 602 can cause device 600 to move from left to right in FIG. 6. As described above, the gap 306 in base 302 can be configured to accommodate rod 604 allowing device 600 to move without obstruction through the first instance of device 400 that generates field pattern 500a. Next, a second instance of device 400, represented by field pattern 500b that is placed in series with, or linked with the first instant of device 400, continues the process. Multiple instances of device 400 can be linked in various configurations including, but are not limited to, a circle or a linear array as described below.

Figure 7A:
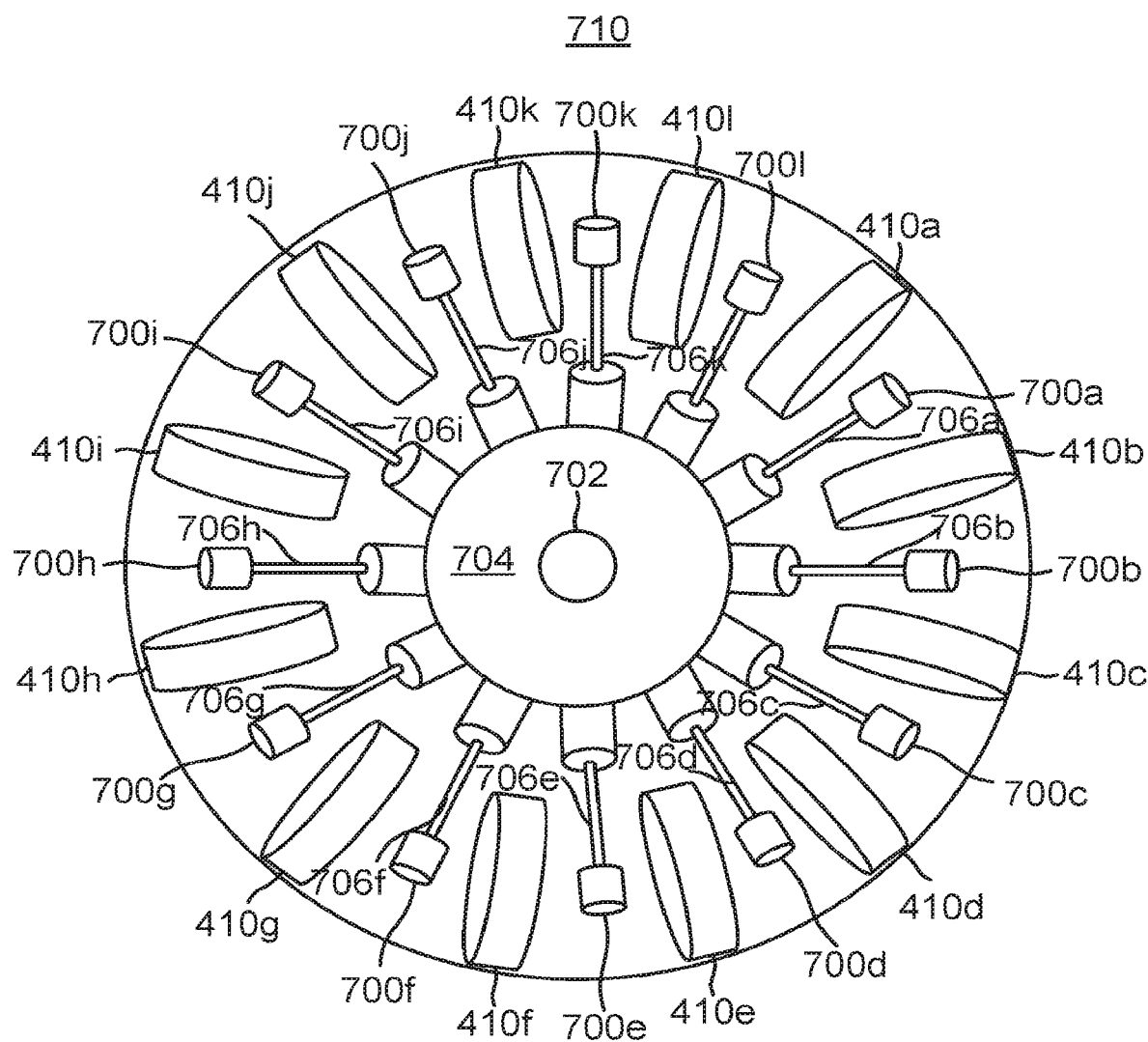
FIG. 7A illustrates a magnetic rotor-stator device that includes a circular array of magnetic field generating devices configured as stators to drive a rotor wheel around a shaft that includes a circular array of magnets attached to the rotor wheel through a set of rods in accordance with some embodiments described herein.

FIG. 7A illustrates a magnetic rotor-stator device 710 that includes a circular array of magnetic field generating devices 410a-410l configured as stators to drive a rotor wheel 704 around a shaft 702 that includes a circular array of magnets 700a-700l attached to the rotor wheel 704 through a set of rods 706a-706l in accordance with some embodiments described herein. While magnetic rotor-stator device 710 includes many more instances of magnetic field generating device 400 and many more magnets 700 than the exemplary system shown in FIG. 6, the driving mechanism is essential the same as the process described above in conjunction with FIG. 6. While the rotor wheel 704 is rotating, each narrow rod 706 can pass through each gap 306 (not shown) of each base 302 of each device 410, while each magnet 700 passes through the opening of each base 302 in the middle of each base 302.

Figure 7B:
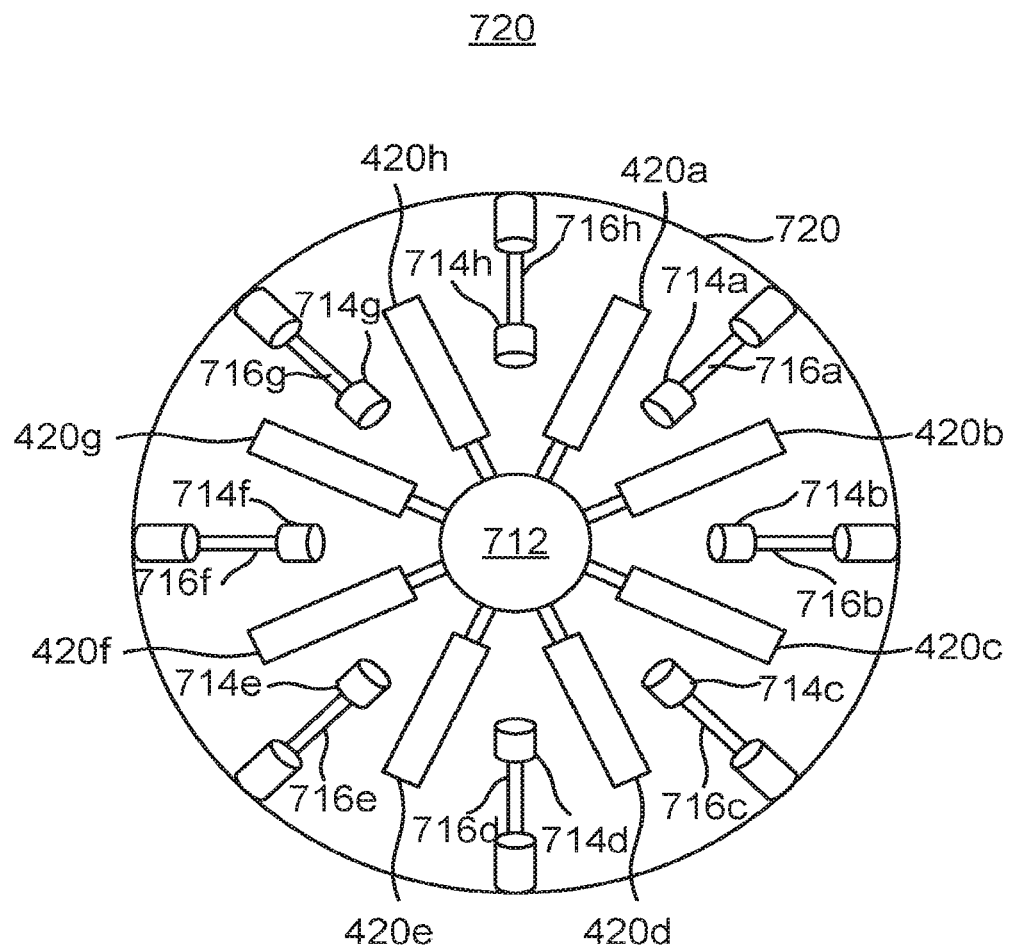
FIG. 7B illustrates an alternative magnetic rotor-stator device that includes a circular array of magnetic field generating devices attached to a center shaft acting as the rotor and a set of magnets attached to the outside of the rotor-stator device through a corresponding set of rods and acting as the stator in accordance with some embodiments described herein.

FIG. 7B illustrates an alternative magnetic rotor-stator device 720 that includes a circular array of magnetic field generating devices 420a-420h attached to a center shaft 712 acting as the rotor while a set of magnets 714a-714h attached to the outside of rotor-stator device 720 through a corresponding set of rods 716a-716h and act as the stator in accordance with some embodiments described herein.

Figure 7C:
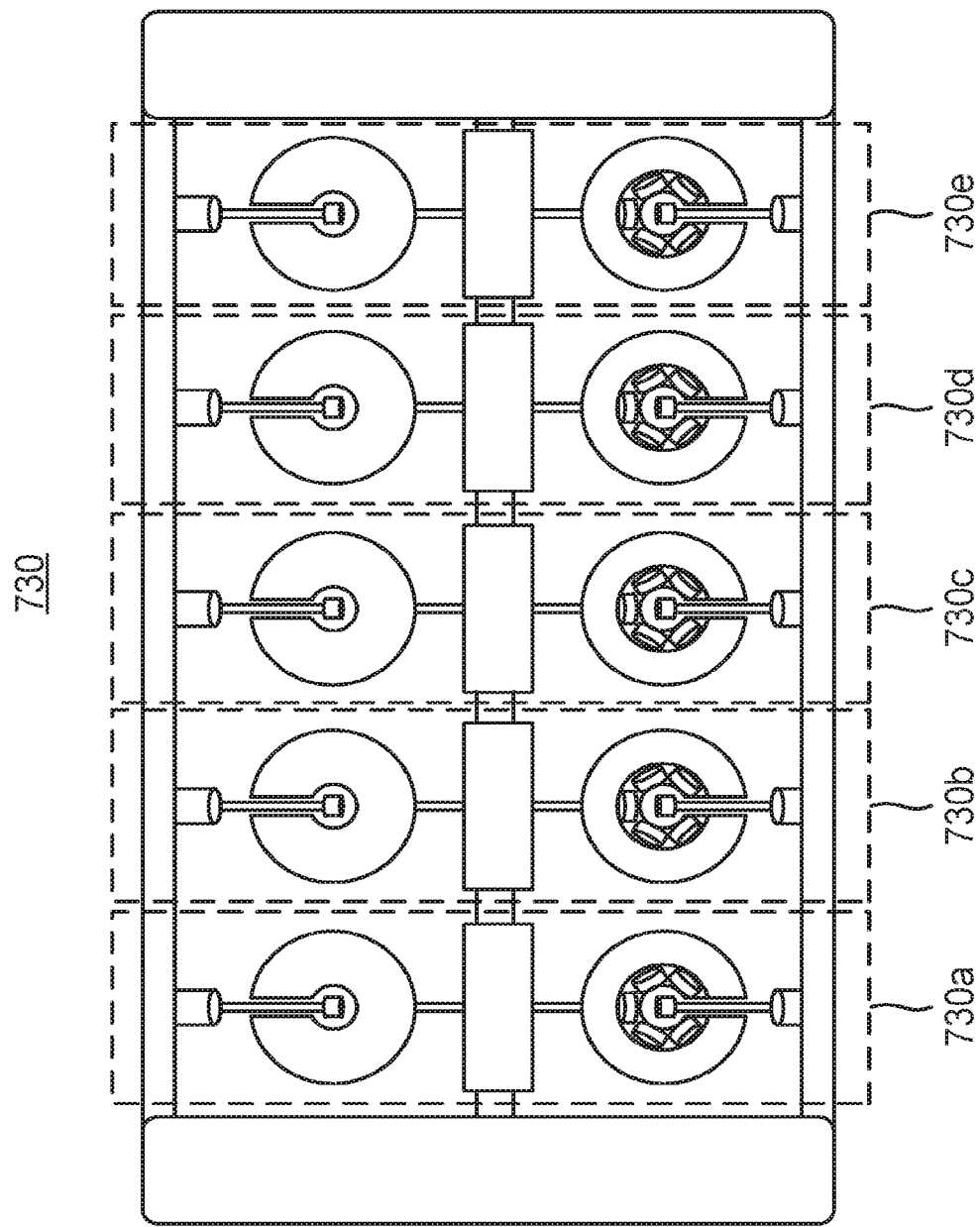
FIG. 7C illustrates another example of a magnetic rotor-stator device based on the magnetic rotor-stator device described in FIG. 7B.

FIG. 7C illustrates another example of magnetic rotor-stator device 730 based on the magnetic rotor-stator device 720 described in FIG. 7B. As can be seen in FIG. 7C, magnetic rotor-stator device 730 includes a set of identical subsections 730a to 730e, and each of the subsections 730 is constructed in a matter similar to the magnetic rotor-stator device 720 described in FIG. 7B.

In some embodiments, if magnet 602 in FIG. 6 is an electromagnet, then the polarity of magnet 602 can be advantageously switched or turned off to aid the operation described above. This is illustrated in conjunction with FIGS. 8A-8H, which describes a process of moving an electromagnetic device 800 from left to right through an array of field patterns 500a-500c of three instances of devices 400 while switching the polarities of device 800.

FIG. 8A illustrates the initial position of the electromagnetic device 800 before entering the first north pole of field pattern 500a. As can be seen in FIG. 8A, device 800 can have the magnetic polarity orientation of north-south as illustrated such that it will move left to right under the influence of field pattern 500a as described above. FIG. 8B illustrates electromagnetic device 800 completely enters north pole field 506a after being attracted by the first north pole of field pattern 500a. More specifically, in FIG. 8B, the polarity of device 800 has just switched from the initial north-south to south-north to facilitate the device 800 to easily move into and across the south pole in the middle of field pattern 500a. This first switch operation may be useful when the north pole of field pattern 500a does not provide enough momentum to overcome the repellant force from the south pole of field pattern 500a.

Figure 8C:
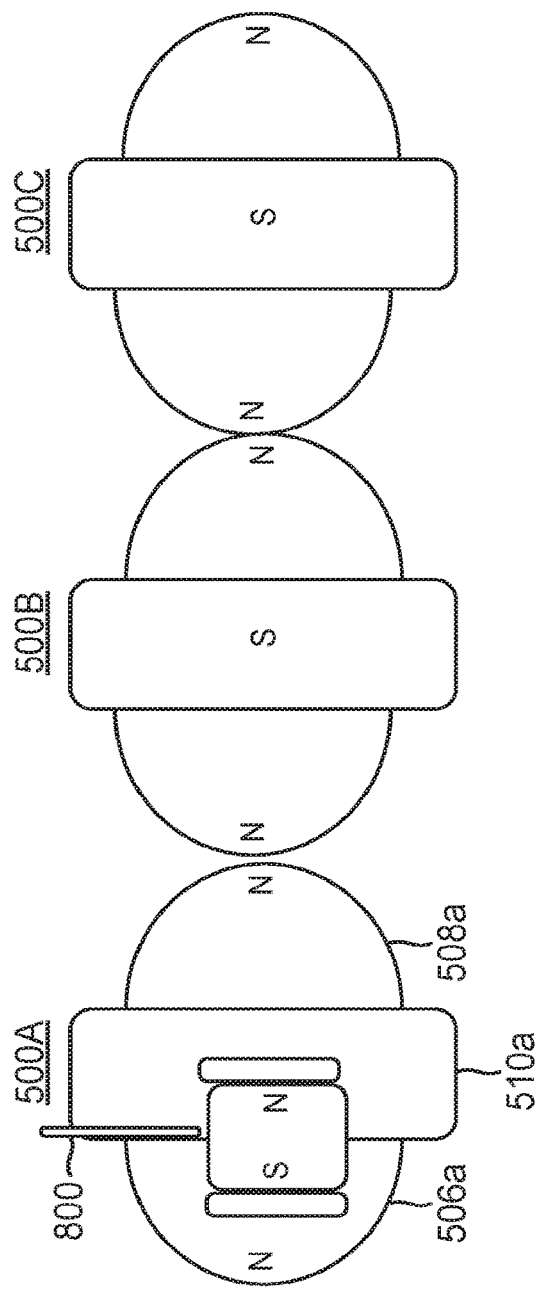
FIG. 8C illustrates the electromagnetic device has moved from the first north pole field into the south pole field in the middle of field pattern 500*a* under the attraction force of the south pole.
Figure 8D:
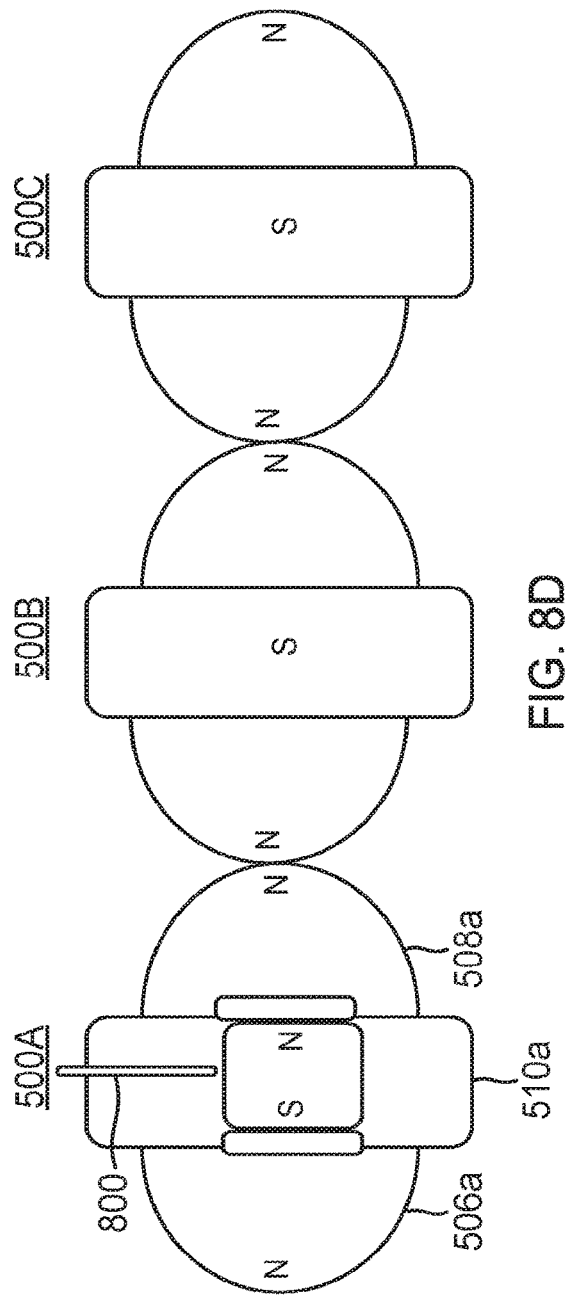
FIG. 8D illustrates the electromagnetic device has completely entered field 510*a* and the polarities of the device remain the same.

FIG. 8C illustrates electromagnetic device 800 has moved from field 506a into south pole field 510a in the middle of field pattern 500a under the attraction force of the south pole, while FIG. 8D illustrates electromagnetic device 800 has completely entered field 510a and the polarities of device 800 remain the same.

FIG. 8E illustrates electromagnetic device 800 has entered the second north pole field 508a in field pattern 500a and the polarities of device 800 remain the same. Note that, as device 800 exits the south pole field 510a and enters north pole field 508a, there is a point at which the north pole field 506b of the next field pattern 500b has not started pushing back on device 800. In one embodiment, this is the point at which the north pole of device 800 remains interacting with the north pole field 506a of field pattern 500a. This can be a desired point of time to switch the polarities of device 800 from south-north back to north-south or turn off the electromagnetic all together and allow it to coast.

FIG. 8F illustrates electromagnetic device 800 has again switched polarities from south-north back to north-south, and as a result, the north pole field 508a of field pattern 500a will repel the north pole of device 800 and the north pole field 506b of field pattern 500b will attract the south pole of device 800. As can be seen, this condition is similar to the initial condition illustrated in FIG. 8A which leads device 800 to move into field 506b of field pattern 500b, as is illustrated in FIG. 8G, and the above described process can repeat. As can be seen in FIG. 8H, the polarities of device 800 has switched again from north-south back to south-north to facilitate device 800 to move across the second south pole field 510b of field pattern 500b.

Comparing to the non-switching process described in conjunction with FIG. 6, the switching operation in combination with turning the electromagnets off described above can make the operation much more efficient. In various embodiments, the spacing between adjacent instances of devices 400 and the timing of the switching play an important role in the operation and the amount of improvement in operation efficiency.

In an alternative embodiment to the process described above, instead of switching the polarities of the electromagnet 800, the magnetism may be briefly switched off at some points in the process to facilitate the electromagnetic device 800 to move from poles to poles. For example, in FIG. 8B, instead of switching, the magnetism of electromagnetic device 800 may be briefly turned off to allow the momentum to carry electromagnetic device 800 into south pole field 510a. After the electromagnetic device has completely entered the south pole, the magnetism can then to turned back on to active the attraction force between the south pole of electromagnetic device 800 and the north pole field 508a and the repel force between the south pole of electromagnetic device 800 and the south pole field 510a so that electromagnetic device 800 moves into the second north pole field 508a efficiently. In some other embodiments, switching of polarities and turning on and off the magnetism can be combined into the same operation.

It should also be noted that in certain embodiments, the magnet-rod devices can actually be in a fixed position and magnetic field generating devices can be configured to allow them to move right to left under the same principles of interaction between the fields.

Figure 9B:
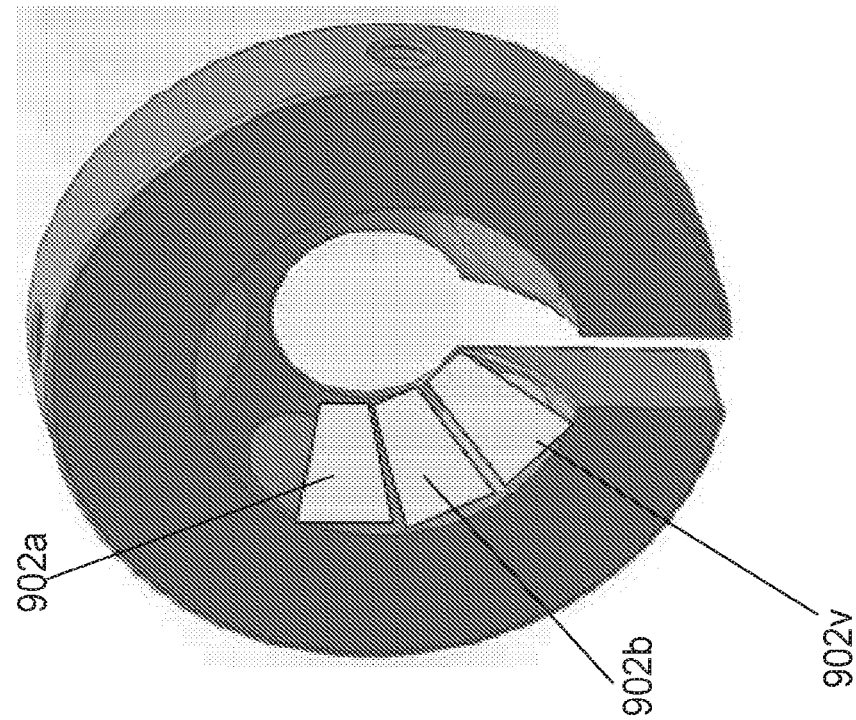
FIG. 9B illustrates an alternative magnetic field generating device which uses surface mounting magnets in accordance with some embodiments described herein.
Figure 9A:
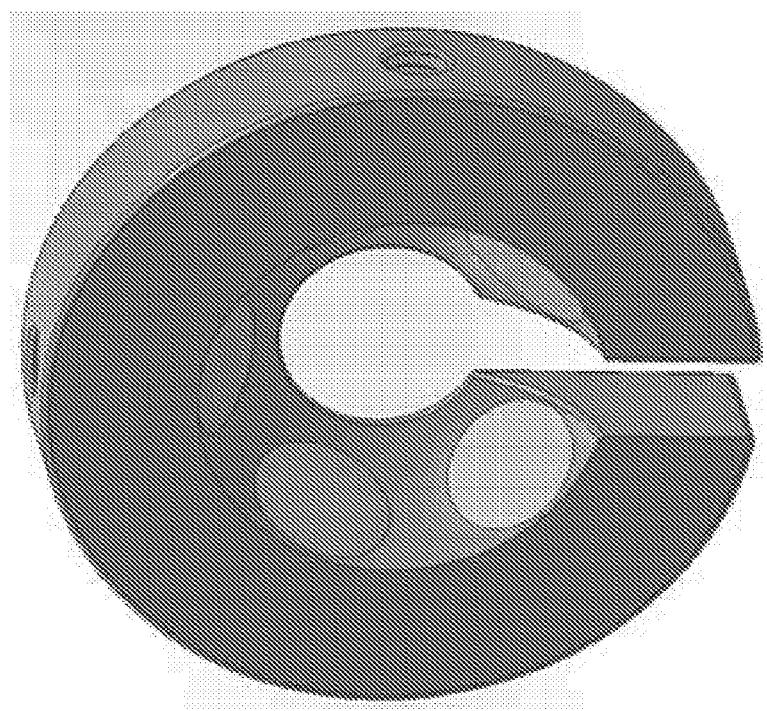
FIG. 9A illustrates an exemplary embodiment of the proposed magnetic field generating device that includes a base having a parabolic shaped inner wall and a set of magnets installed inside a corresponding set of magnet placement locations within the inner wall.

FIG. 9A illustrates a device 900A which is an exemplary embodiment of device 300 or device 400 that includes a base having a parabolic shaped or an angled inner wall and a set of magnets installed inside a corresponding set of magnet placement locations within the inner wall which are spaced substantially evenly around the ring shaped base. At least part of each of the five magnet placement locations is seen in FIG. 9A. Thus, there are a total of five evenly spaced magnet placement locations in this embodiment which each receive a magnet.

FIG. 9B illustrates an alternative magnetic field generating device 900B which uses surface mounting magnets in accordance with some embodiments described herein. As can be seen in FIG. 9B, device 900B includes a base substantially identical to the base of device 900B. However, instead of using magnets which are installed into the recesses as in device 900A, device 900B uses a set of surface mount magnets 902 attached directly to the surface of the inner wall of device 900B. Notably, each of these magnets takes on the parabolic shape of the inner wall. In some embodiments, each of the magnets 902 has a trapezoid geometry to facilitate achieving a maximum coverage of the inner wall. This increased coverage of the inner wall enables generating a desired three-field magnetic field pattern having a stronger intensity.

Referring back to FIG. 4B, another important aspect or property of device 400 as illustrated in FIG. 4B is related to the interface of the north poles 406 and 408 with south pole 410. Note that these two interfaces, located approximately at the two openings indicated by the two dark lines 416 and 418, are the locations where the magnetic field changes polarities. As a result of the device 400 having these openings, these interfaces or transition boundaries between north poles and south pole become accessible to objects. In contrast, these locations are not accessible in permanent magnets such as bar magnet 100 in FIG. 1 because they are located inside the magnet itself.

The configuration of device 400 is such that, if another magnet is inserted between north pole 406 and south pole 410, or between north pole 408 and south pole 410 that is smaller than openings 416 and 418 respectively, then the magnet will "register" right at the interface of the poles and hover over or "be suspended at" the opening 416 or 418. Notably, this property is not affected by the orientation of device 400, whether device 400 is placed vertically or horizontally. If a pressure is applied to the hovering magnet and then released, the magnet will incline to return to substantially the same location. Thus, the combination of such a magnet and the device 400 can be used to create a force measuring transducer. Moreover, this combination device can also be used to create other types of transducers, valves, speakers, microphones, pumps, among others. Also note that, when the polarities of this combination device are suddenly reserved, the registered magnet will flip inside the space where it suspends at. This additional property can be utilized to make motors, fans, flow devices, and other devices which can take advantage of this property.

Figure 10C:
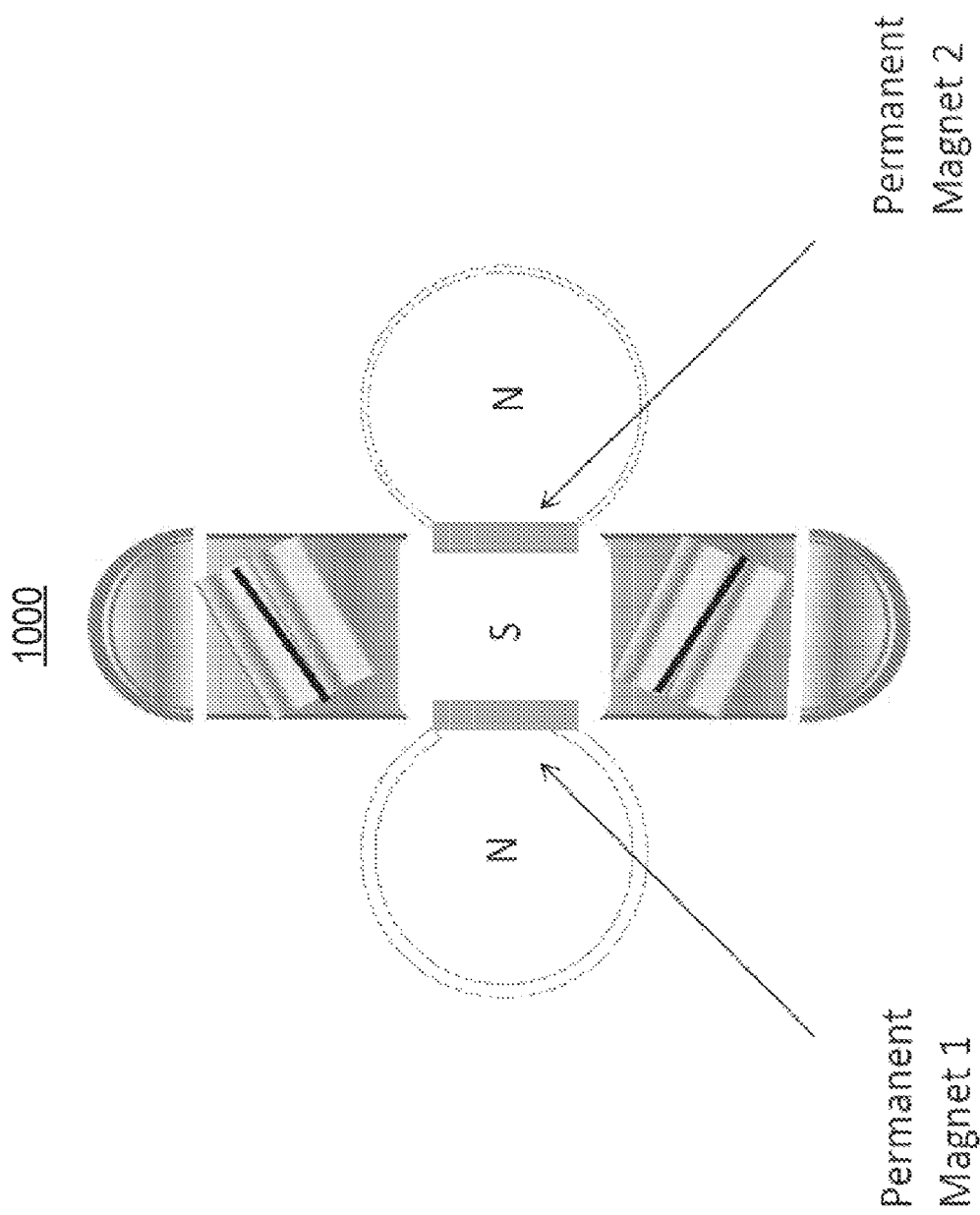
FIG. 10C shows magnetic suspension using the magnetic device 1000 where two permanent magnets 1 and 2 are suspended at the two transition boundaries —position 1 and position 2 in accordance with some embodiments described herein.

FIG. 10A shows a cross-sectional view of another example of the proposed magnetic device 1000 which includes two openings and the associated field pattern with three poles in accordance with some embodiments described herein. In this figure, the two transition boundaries are indicated as "position 1" and "position 2," respectively. FIG. 10B shows a perspective view of magnetic device 1000 having the two transition boundaries at the two openings in accordance with some embodiments described herein.

FIG. 10O shows magnetic suspension using the magnetic device 1000 where two permanent magnets 1 and 2 are suspended at the two transition boundaries —position 1 and position 2 with perfect fidelity in accordance with some embodiments described herein. Notably, while magnetic device 1000 in FIG. 10B shows a gap, other embodiments of magnetic device 1000 do not need to have a gap when the device is used to suspend a permanent magnet as described above.

In addition to the exemplary devices and systems described above, numerous other devices and machines can be designed that take advantage of the field properties of the proposed magnetic device such as device 400. For example, an efficient fly wheel can be designed for storing kinetic energy or device 400 can also be used as a fan blade to cool electromagnetic components.

While certain embodiments have been described above, it will be understood that the embodiments described are by way of example only. Accordingly, the systems and methods described herein should not be limited based on the described embodiments. Rather, the systems and methods described herein should only be limited in light of the claims that follow when taken in conjunction with the above description and accompanying drawings.

What is claimed:

1. A magnetic device, comprising:
   a first magnetic field generator configured to generate a first magnetic field pattern comprising a first magnetic field of a first polarity, and a second magnetic field and a third magnetic field both of a second polarity and located on either side of the first magnetic field; and
   a second magnetic field generator coupled in series with the first magnetic field generator and configured to generate a second magnetic field pattern which is substantially identical to the first magnetic field pattern,
   wherein at least one of the first and second magnetic field generators comprises:
   a base including an upper surface, a lower surface, and an inner wall and an outer wall that are sandwiched between the upper surface and the lower surface, wherein the upper surface includes a first opening defined by the upper edge of the inner wall, the lower surface includes a second opening defined by the lower edge of the inner wall; and
   the base further includes a set of magnet placement locations positioned around the inner wall of the base, each magnet placement location of the set of magnet placement locations being separated from other magnet placement locations of the set of magnet placement locations by a distance, d;
   a set of magnets placed to cover a portion of the inner wall, wherein each of the magnets is positioned such that an axis of the magnet connecting the north pole and the south pole of the magnet forms a slanted angle with respect to the upper and lower surfaces;
   wherein each magnet of the set of magnets has a width and the width of each magnet of the set of magnets is greater than the distance, d, separating each magnet placement location of the set of magnet placement locations;
   wherein the set of magnets is positioned in a parabolic shape; and
   wherein the base is ring-shaped, with each of the upper surface and the lower surface having circular shaped surface.

2. The device of claim 1, wherein the first polarity is magnetic north and the second polarity is magnetic south.

3. The device of claim 1, wherein the first polarity is magnetic south and the second polarity is magnetic north.

4. The device of claim 1, wherein each of the first and second magnetic field generators comprises:
   a base including an upper surface, a lower surface, and an inner wall and an outer wall that are sandwiched between the upper surface and the lower surface, wherein the upper surface includes a first opening defined by the upper edge of the inner wall, the lower surface includes a second opening defined by the lower edge of the inner wall; and
   a set of magnets placed to cover a portion of the inner wall, wherein each of the magnets is positioned such that an axis of the magnet connecting the north pole and the south pole of the magnet forms an angle with respect to the upper and lower surfaces.

5. The device of claim 1, wherein the set of magnet placement locations is a set of recessed locations within the inner wall of the base.

6. The device of claim 1, wherein the set of magnet placement locations are locations on the surface of the inner wall of the base.

7. The device of claim 1, wherein each of the set of magnets located in or around the inner wall has a trapezoid, circular, square, and/or triangular geometry.

8. The device of claim 1, wherein the set of magnets includes two or more magnets.

9. The device of claim 1, further comprising one or more additional magnetic field generators coupled in series with the first and second magnetic field generators and configured to generate one or more additional magnetic field patterns which are substantially identical to the first and second magnetic field patterns.

10. The device of claim 9, wherein the first, the second, and the one or more additional magnetic field generators form an array defining a predetermined combined field pattern configured for propelling a magnetic or electromagnetic object in a predetermined path through the combined field pattern.

11. The device of claim 9, wherein the first, the second, and the one or more additional magnetic field generators form a circular array having a central rotatable shaft, the device further comprising at least one electromagnetic object associated with the shaft and configured to be propelled in a circular path to rotate the shaft.

12. The device of claim 1, further comprising a magnetic object associated with the magnetic field generators and configured to be propelled through the combined field pattern.

13. The device of claim 12, wherein the magnetic field generators each comprise a set of electromagnets which are switchable in polarity from first-second-first polarities to second-first-second polarities to vary the polarity at selected locations in the combined field pattern, and the magnetic field generators are configured to propel the magnetic object along a predetermined path through the combined field pattern.

14. The device of claim 12, wherein the magnetic object is an electromagnet.

15. A magnetic device, comprising:
   a base that includes an upper surface, a lower surface, and an inner wall and an outer wall that are sandwiched between the upper surface and the lower surface,
   wherein the upper surface includes a first opening defined by the upper edge of the inner wall, the lower surface includes a second opening defined by the lower edge of the inner wall; and
   wherein the base further includes a set of magnet placement locations between the inner wall and the outer wall, and arranged around the base, each magnet placement location of the set of magnet placement locations being separated from other magnet placement locations of the set of magnet placement locations by a distance; and
   a set of magnets placed around the inner wall, such that each of the magnets is placed at a magnet placement location among the set of magnet placement locations, wherein each of the magnets is positioned such that an axis of the magnet connecting the north pole and the south pole of the magnet forms a slanted angle with respect to the upper and lower surfaces;
   wherein each magnet of the set of magnets has a width and the width of each magnet of the set of magnets is greater than the distance, d, separating each magnet placement location of the set of magnet placement locations;
   wherein the set of magnets is positioned in a parabolic shape; and wherein the base is ring-shaped, with each of the upper surface and the lower surface having circular shaped surface.

16. The magnetic device of claim 15, wherein the set of magnet placement locations includes two locations.

17. The magnetic device of claim 15, wherein the set of magnet placement locations includes three or more locations.

18. The magnetic device of claim 15, wherein an upper portion of each of the magnet placement locations is thinner than a lower portion of the magnet placement location.

19. The magnetic device of claim 15, wherein each magnet within the set of magnets includes a surface in the vicinity of the inner wall which has an angular shape.

* * * * *